United States Patent [19]

Kimberly, Jr.

[11] Patent Number: 5,265,276
[45] Date of Patent: Nov. 30, 1993

[54] HELMET VISOR ADAPTOR ASSEMBLY

[75] Inventor: Jack L. Kimberly, Jr., Shippensburg, Pa.

[73] Assignee: The United States of America as represented by the Secretary of the Army, Washington, D.C.

[21] Appl. No.: 22,232

[22] Filed: Feb. 25, 1993

[51] Int. Cl.⁵ .............................................. A42B 3/04
[52] U.S. Cl. ........................................ 2/6.2; 2/6.3
[58] Field of Search ................ 2/6, 10, 422, 424; 359/409, 410, 411

[56] References Cited

U.S. PATENT DOCUMENTS

| | | | |
|---|---|---|---|
| 3,081,460 | 3/1963 | Miller | 2/6 |
| 3,117,322 | 1/1964 | Goldman | 2/6 |
| 3,237,202 | 3/1966 | Aileo | 2/6 |
| 3,315,272 | 4/1967 | Olt et al. | 2/424 |
| 3,491,371 | 1/1970 | De Angelis | 2/6 |
| 3,568,211 | 3/1971 | Petruzella, Jr. | 2/6 |
| 3,585,638 | 6/1971 | Aileo | 2/6 |
| 3,601,813 | 8/1971 | Aileo | 2/6 |
| 4,028,739 | 6/1977 | Bell et al. | 2/6 |
| 4,922,550 | 5/1990 | Verona et al. | 2/6 |
| 4,987,608 | 1/1991 | Cobb | 2/6 |

*Primary Examiner*—Clifford D. Crowder
*Assistant Examiner*—Michael A. Neas
*Attorney, Agent, or Firm*—Milton W. Lee; Alain L. Bashore; Anthony T. Lane

[57] ABSTRACT

A visor adaptor assembly for use in conjunction with an aviator's helmet adapted for supporting a helmet sighting system and night vision enhancement device. A support with vertical slot is adaptable to be mounted on a helmet and further includes a connector partially projecting through the slot with a connector extension coupled to the connector. A visor extension is connected to the connector which is coupled to an aviator's visor and a position adjustment nut is releasably coupled to the connector extension. Manual adjustment of the nut along the vertical slot adjusts the aviator's visor vertically within the support.

2 Claims, 3 Drawing Sheets

HELMET VISOR ADAPTOR ASSEMBLY

BACKGROUND OF INVENTION

1. Field of the Invention

The present invention generally relates to helmet visor adaptors and more specifically, to a helmet visor adaptor adapted for supporting a night vision enhancement device.

2. Description of Related Prior Art

In 1970 the U.S. Army introduced the current Army Aviation helmet, designated sound protective helmet model number 4 (SPH-4) which has continued to serve as the standard issue flight helmet in the U.S. Army. The SPH-4 was designed to include additional protection for hearing and provide for communication assessories such as a microphone and earphones. A single visor assembly was mounted to the front of the SPH-4 which provided a protective cover and guide for a standard aviator's clear or tinted visor which could be moved in front of the aviator's eyes or retracted when needed.

With the advent of sophisticated tasks required of the aviator, especially electronic information simultaneously inputted and evaluated has led to a need for mounting sighting systems on the SPH-4 with the use of a support means. A helmet sight assembly was designed which combined the function of the visor assembly with a mounting for a helmet sighting system (HSS) and associated electrical wiring placement. The helmet sight assembly is mounted using existing mounting holes on the SPH-4. With the adaptation of night vision enhancement capabilities for the U.S. Army Aviator there resulted in the need for mounting the Aviator Night Vision System (ANVIS) to the existing support means. The visor slot on the helmet sight assembly is currently used for mounting the ANVIS without a design change to the helmet sight assembly. This has resulted in the problem that the modified helmet sight assembly currently does not allow the use of a standard visor when the ANVIS is utilized on the SPH-4.

While the prior art has reported using a ANVIS mounted on a modified helmet sight assembly, none have established a basis for a specific apparatus that is dedicated to the task of resolving the particular problem at hand. A standard visor is a requirement for eye protection of the aviator for such dangers as safety at a Forward Army Refueling Point (FARP) and from the varied dangers of visual glare to laser weapons.

What is needed in this instance is a visor adaptor assembly that allows the use of a helmet visor on a support means such as a helmet sight assembly modified to use the ANVIS.

SUMMARY OF THE INVENTION

The primary object of this invention is to provide helmet visor capability adapted for supporting a helmet sight assembly modified to use the ANVIS whereby the visor may be manually adjusted as needed.

According to the invention, there is disclosed a visor adaptor assembly for use in conjunction with an aviator's helmet modified to use a night vision enhancement device. A support means adaptable to mount on the helmet includes an outwardly extending depression with a slot centrally located in the support means extending forwardly to the approximate front portion end of the support means. A lock washer allows substantially no binding of the position adjustment nut when selectively adjusting the visor position yet allow sufficient contact between elements in a visor adjustment means. An aviator's visor is releasably coupled to a visor extension means moved by manual adjustment of a position adjustment nut along the slot allowing vertical movement of the visor.

BRIEF DESCRIPTION OF THE DRAWINGS

The foregoing and other objects, aspects and advantages will be better understood from the following detailed description of a preferred embodiment of the invention with reference to the drawings, in which.

PREFERRED EMBODIMENTS

Figure 1:
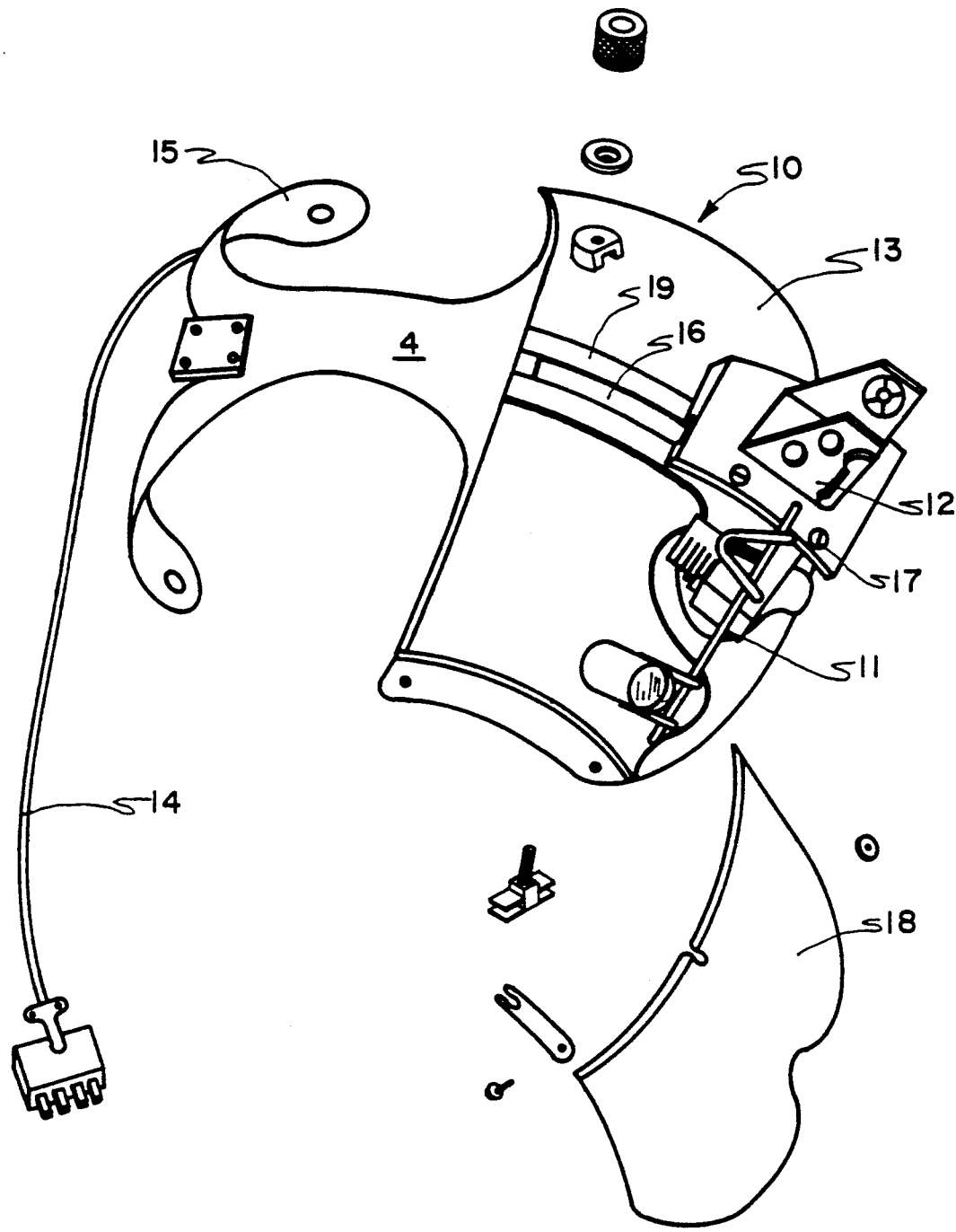
FIG. 1 is an expanded view of the helmet visor adaptor and its placement on the modified helmet sight assembly.

The preferred embodiment will now be discussed with reference to the drawing figures. FIG. 1 shows an exploded layout view of the components of the present invention. The support means depicted in the preferred embodiment is a helmet sight assembly 10 which includes helmet sighting system 11 and ANVIS mounting 12 for the Aviator Night Vision System (ANVIS) both on front portion 13 of assembly 10, including an underlay support structure 4. Electrical connecting cable 14 allows for an electrical connection of system mounted to helmet sight assembly 10 of which cable 14 exits through a back portion of which is generally designated as back portion 15 of assembly 10. The two back portions shown in FIG. 1, also functions to provide extra stability to the entire helmet sighting assembly when attached to a helmet since extra forward weight is present with the ANVIS mounted. As also generally depicted in FIG. 1, helmet sight assembly 10 is of a general shape that essentially conforms to a substantial portion of the contour of an aviator's helmet. Open slot 16 extends forwardly to the approximate front portion of helmet sight assembly 10, of which ANVIS mounting 12 is mounted to an open portion of slot 16 at anchor points 17. The open portion of slot 16 is used to facilitate movement of standard aviator visor 18 in front of the aviator's eyes by sliding movement along slot 16, which open portion extends rearwardly from the front portion of the support means as shown in FIG. 1, (not occupied by ANVIS mounting 12) on raised edges 19 of an outwardly extending depression.

It is understood that while the preferred embodiment describes a particular helmet sight assembly shown in the drawing figures, any support means with a vertical slot therein maybe used. It is also understood that any night vision enhancement device may be used, not only the preferred embodiment described. A more detailed description of the helmet visor adaptor assembly will next be described.

Figure 2:
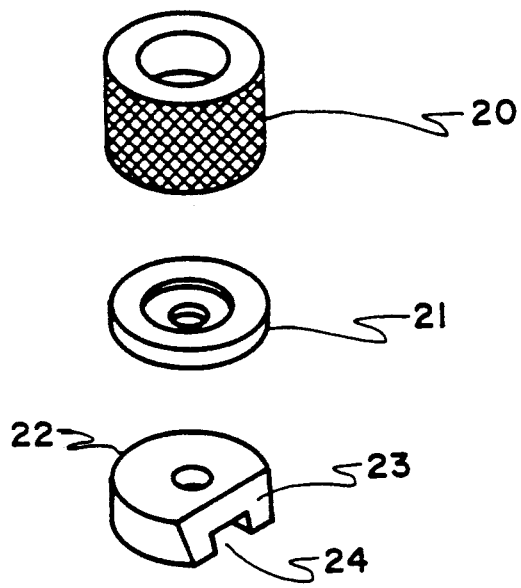
FIG. 2 is an exploded view of the helmet visor adaptor.
Figure 2:
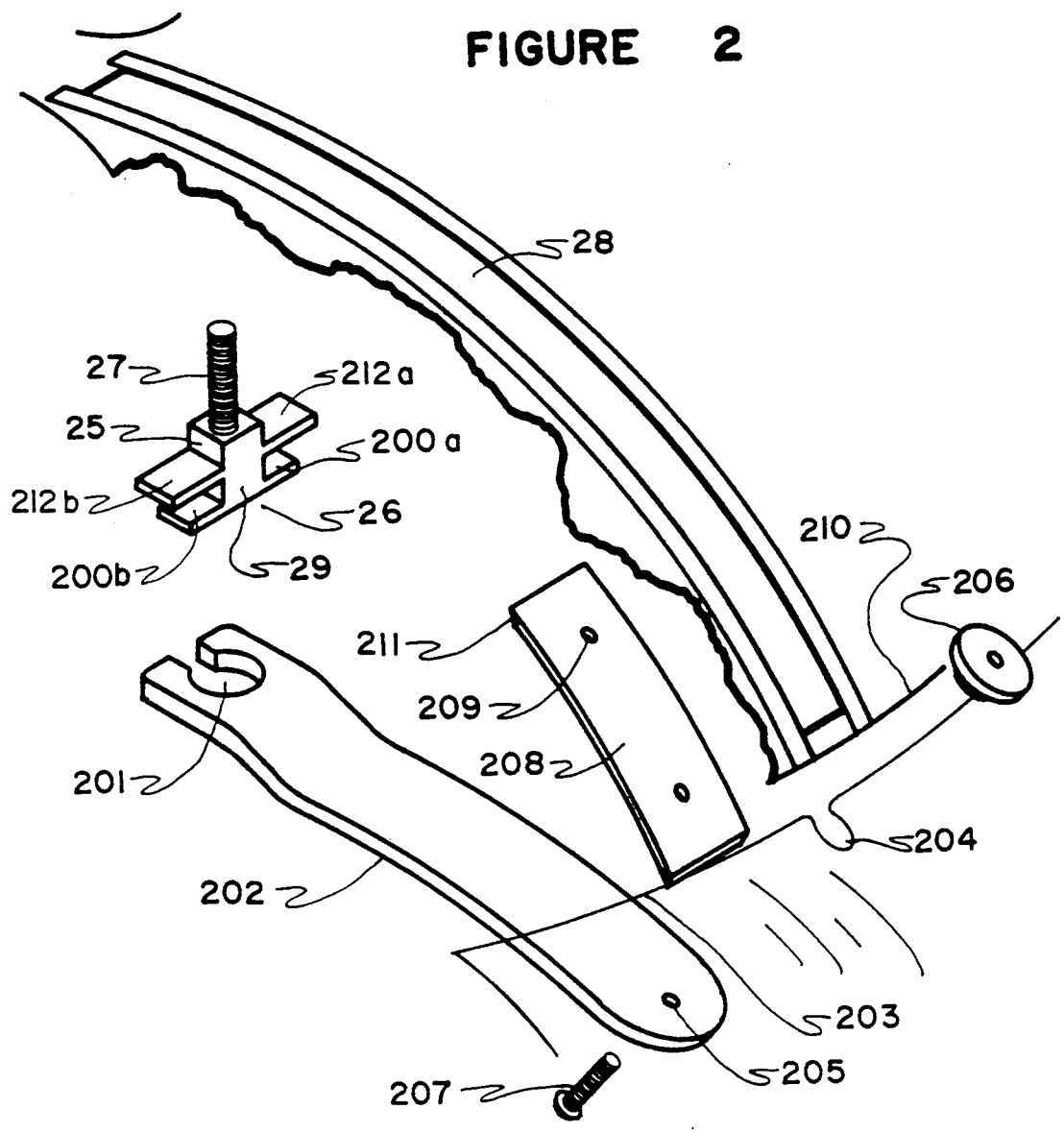

FIG. 2 depicts a visor adjustment means, including a threaded connector 26 coupled to the visor 18 shown in FIG. 1, through visor extender 202 for adjustably extending the positioning of the visor. The visor position nut 20 located on other end of the visor adjustment means has a gnarled outer surface for ease of manipulation to loosen for movement of visor 18 along slot 16 of FIG. 1 and to tighten to fix in place. Washer 21 of FIG.

2 is coupled in between visor position nut 20 and lock washer 22. Lock washer 22 slides on surface 19 of FIG. 1 along open slot 16 and is half-circular so that flat end 23 does not interfere with ANVIS mounting 12 of FIG. 1, yet allows for ease of movement along surface 19 of FIG. 1 without instability of the overall visor adjustment means. Radially extending slot 24 has a width and depth along the length of, and in one face of washer 22 such as to engage with rectangularly shaped protrusion 25 of threaded connector 26 such that no rotational movement of connector 26 is possible. Threadable engagement means 27 which extends outward from rectangularly shaped protrusion 25 releasably coupled outward on assembly 10 to visor position nut 20 with washer 21 and lock washer 22 therebetween.

Threaded connector 26 coupled with lock washer 22 allows for sliding engagement of the entire assembly along rails 28 such that rectangularly shaped protrusion 25 does not allow for rotational movement as described above and substantially no binding of position nut 20. Connector 26 has a rectangularly shaped plate 212 which is larger in one length than the width of slot 28. From the center of plate 212 is rectangular protrusion 29, on end of which is two engagement arms 200a and 200b. Engagement arms 200a and 200b extend outwardly opposed and parallel to plate extensions 212a and 212b shown, and also to rectangular protrusion 29. Engagement arms 200a and 200b releasably engage with visor extender open notch 201 of visor extender 202. An elongated visor extender 202 allows for a releasably connectable extension of visor 203 at visor open notch 204 to visor extension hole 205 with visor attachment connector 206 and screw 207. By utilizing open notch 201 engaged to either side of arm extension 200, visor extender 202 may be removed by turning extender 202 may be removed by turning extender 202 to an approximately 90 degree position with respect to slot connector 26. Visor extender 202 is partially bent along its elongated side at a position halfway between open notch 201 and visor extension hole 205 so that visor extender 202 may move along the elongated side essentially parallel to slot 16 behind outwardly extending depression shown as raised edge 19 in FIG. 1.

ANVIS mounting plate 208 which is formed as a one-piece rectangular element is wider than open slot 16 of FIG. 1 such that it is placed behind helmet sight assembly 10 as shown in FIG. 2 and releasably coupled to holes 209 to anchor points 17 of FIG. 1. End 211 of mounting plate 208 is smoothened to allow movement of extender 202 behind mounting plate 208 when fixed in place.

Figure 3:
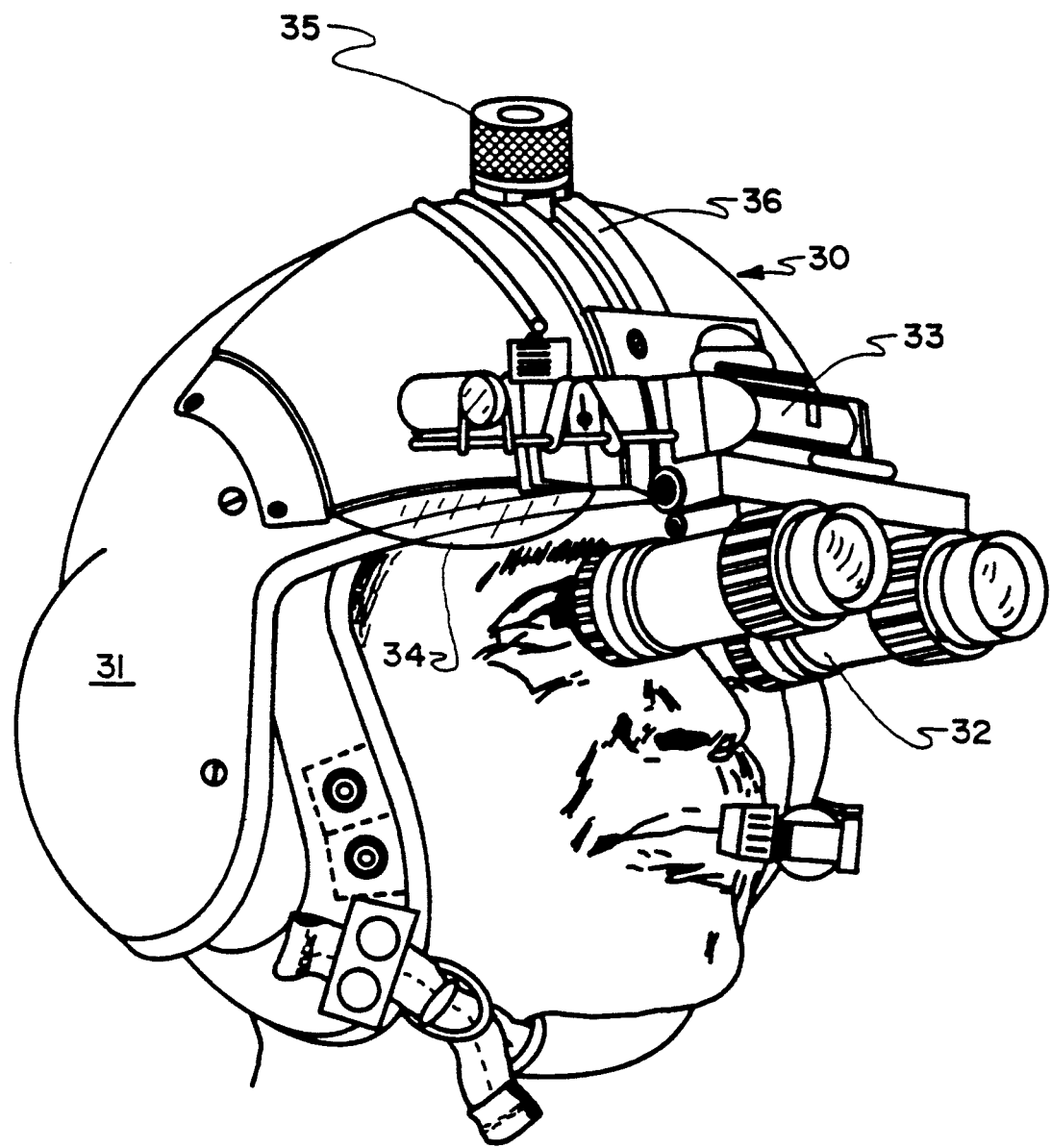
FIG. 3 is the helmet visor adaptor on a modified HSS mounted on the SPH-4 utilizing ANVIS.

The preferred embodiment for use of the helmet visor adaptor assembly of the present invention is shown in FIG. 3. It is noted that the present invention is not limited to the specific type of aviator's helmet disclosed as the preferred embodiment. FIG. 3 depicts helmet sight assembly 30 attached to a sound protective helmet model 4 (SPH-4) 31 with an ANVIS 32 mounted on AVIS mount 33. Aviator's visor 34, which may be clear or tinted, is moved by partially turning to releasably disengage visor position nut 35 so that sliding movement along open rails 36 allows for extension of visor 34 in front of the aviator. Components for the visor adaptor assembly are preferably comprised of any lightweight metal bench stock which would meet weight, strength and vibrational requirements.

While this invention has been described in terms of a preferred embodiment consisting of the particular elements which comprise the helmet visor adaptor assembly, those skilled in the art will recognize that the invention can be practiced with modification within the spirit and scope of the appended claims.

I claim:

1. A visor adaptor assembly for use in conjunction with an aviator's helmet adapted for supporting a helmet sighting system and a night vision enhancement device, comprising:

support means essentially conforming to a substantial portion of the contour of an aviator's helmet, having an outwardly extending depression with a slot centrally located therein and extending forwardly to the approximate front portion end of said support means;

elongated visor extender means for adjustably extending the position of a helmet mounted visor having first and second ends, with said first end releasably coupled to the uppermost portion of the helmet mounted visor;

visor adjustment means having a first end portion coupled to the second end of said elongated visor extender means, and a second end portion extending through said slot in the support means, wherein said second end portion of said visor adjustment means includes a rectangularly shaped protrusion intermediate to said first end portion and said second end portion extends through and is slidably engaged with the slot in said support means, wherein the rectangularly shaped protrusion allows maintaining the visor in proper alignment during adjustment;

threadable engagement means extending on said second end portion of said visor adjustment means, for threadably engaging the visor adjustment means to the support means;

position adjustment nut to mate with said threadable engagement means of said second end portion of said visor adjustment means extending through the slot, so as to releasably couple the visor adjustment means to the support means; and lock washer which is half-circular shaped with a radially extending slot having a width and depth along the length of, and in one face of said washer, approximately equal to the extension of the rectangularly shaped protrusion in width and height above the outwardly extending depression such that when the washer is releasably coupled in between the threadable engagement means mated to the slot and the position adjustment nut, whereby the lock washer allows substantially no binding of the position adjustment nut when selectively adjusting the visor positioning yet allow sufficient contact between elements in the visor adjustment means.

2. The visor adaptor assembly of claim 1, wherein the first end portion of the visor adjustment means has a rectangularly shaped plate larger in at least one length than the width of said slot, where from the center of the plate is a rectangular protrusion, on end of which is two engagement arms extending outwardly opposed and parallel to said rectangularly shaped plate and to said rectangular protrusion, at approximately right angles, wherein the two engagement arms engage with the second end of the elongated visor extender means to move the elongated visor extender essentially parallel to the slot behind said outwardly extending depression.

* * * * *